United States Patent [19]

Miller et al.

[11] 4,190,519

[45] Feb. 26, 1980

[54] COMBINATION PROCESS FOR UPGRADING NAPHTHA

[75] Inventors: Stephen J. Miller, El Cerrito; Thomas R. Hughes, Orinda, both of Calif.

[73] Assignee: Chevron Research Company, San Francisco, Calif.

[21] Appl. No.: 954,064

[22] Filed: Oct. 23, 1978

[51] Int. Cl.$^2$ .................. B01J 29/28; C07C 15/02; C10G 37/10; C10G 39/00

[52] U.S. Cl. .................. 208/79; 208/62; 208/65; 208/102; 585/303

[58] Field of Search .................. 208/79–80, 208/62–66; 260/673, 673.5; 585/303

[56] References Cited

U.S. PATENT DOCUMENTS

| | | | |
|---|---|---|---|
| 3,729,409 | 4/1973 | Chen | 208/135 |
| 3,756,942 | 9/1973 | Cattanach | 208/137 |
| 3,761,389 | 9/1973 | Rollman | 208/64 |
| 3,770,614 | 11/1973 | Graven | 208/62 |
| 3,849,290 | 11/1974 | Wise et al. | 208/66 |
| 3,928,174 | 12/1975 | Bonacci et al. | 208/80 |
| 3,950,241 | 4/1976 | Bonacci et al. | 208/64 |

Primary Examiner—Delbert E. Gantz
Assistant Examiner—G. E. Schmitkons
Attorney, Agent, or Firm—D. A. Newell; R. H. Davies; M. K. Bosworth

[57] ABSTRACT

A straight-run naphtha is fractionated at about 66° C., which is just below the boiling point of methylcyclopentane. The 66° C.+ fraction is reformed, and at least a portion of the reformate combined with the 66° C.− fraction and reacted under aromatization conditions over a ZSM-5-type catalyst to form a $C_5+$ product rich in aromatics. The $C_5+$ aromaticized product and the remaining reformate can be either sent for BTX recovery or used as a high-octane component of a gasoline blending pool.

9 Claims, 1 Drawing Figure

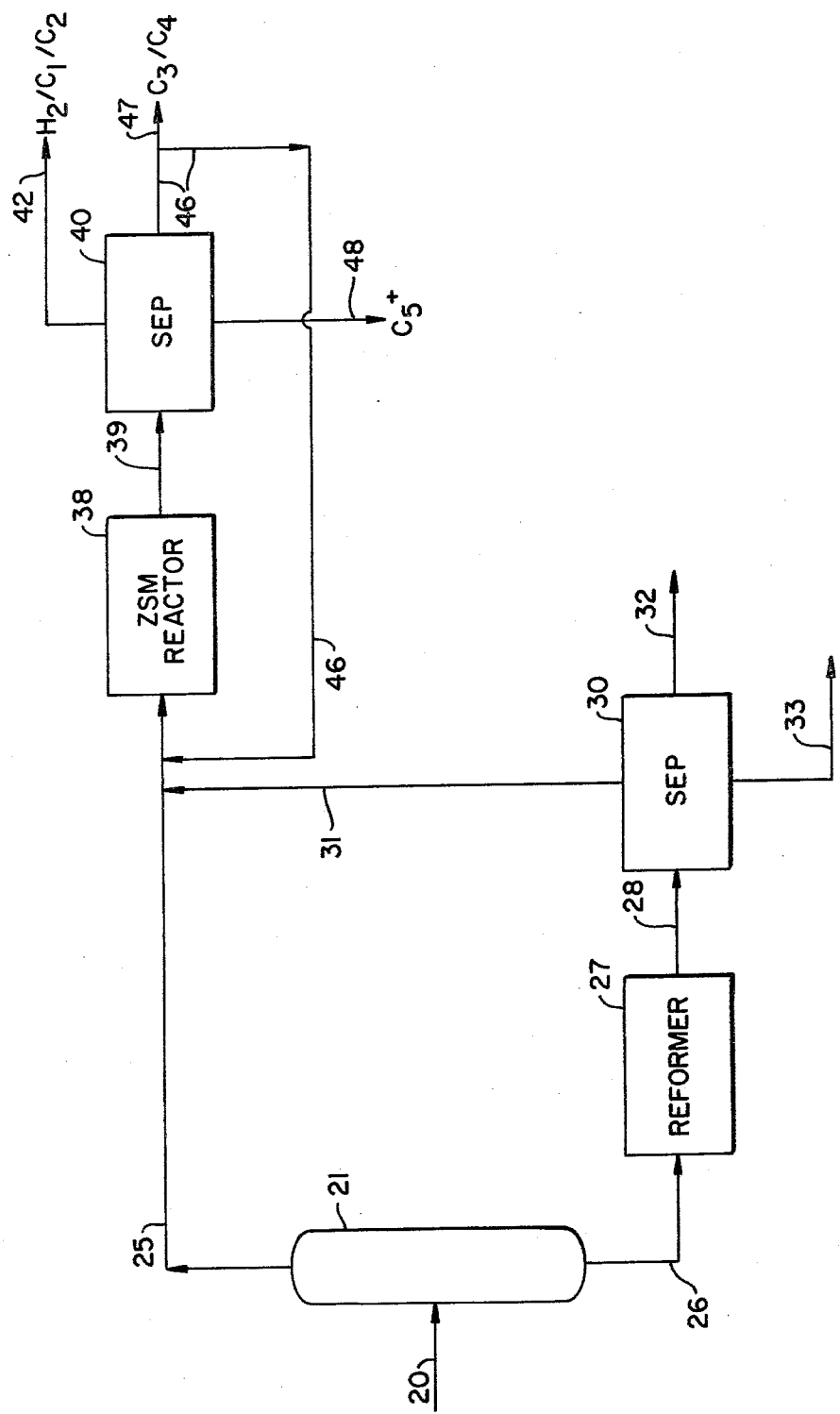

COMBINATION PROCESS FOR UPGRADING NAPHTHA

BACKGROUND AND SUMMARY OF THE INVENTION

This invention relates to a combination process for upgrading a naphtha fraction. Specifically, the invention relates to a process combining reforming and aromatization over a ZSM-5-type zeolite, to produce a product useful as a high-octane gasoline blending stock or a source from which benzene, toluene and xylene can be recovered.

Also, the production of aromatic hydrocarbons such as benzene, toluene and xylene, and in particular para-xylene, is desired because they are useful as solvents and chemical feedstocks.

Also, in view of the current concern over air pollution and environmental control, processes which will increase the octane number of gasoline while minimizing or eliminating the need for additives are being sought.

One traditional way of increasing the octane of a naphtha fraction has been to subject it to catalytic reforming, usually over a platinum-containing or bimetallic catalyst. In the reformer, naphthenes and paraffins are converted to aromatics, both reactions which substantially increase the octane number of the hydrocarbons involved. Naphthenes are reformed to aromatics with high selectivity. However, the selectivity with which paraffins are converted to aromatics decreases with the number of carbon atoms per paraffin molecule. Only a minor fraction of $C_6$ paraffins is converted to benzene. Other reactions which occur in the reformer are isomerization and cracking of paraffins. The cracking to $C_3-$ hydrocarbons represents an irreversible yield loss, and the isomerization of paraffins mainly to singly branched paraffins is a reversible reaction in which a relatively high concentration of low-octane n-paraffins remain in thermal equilibrium with the branched isomers. Thus, inclusion of $C_6$ paraffinic hydrocarbons in a reformer feed is a less efficient use of the catalyst and reactor facilities than the inclusion of $C_6$ naphthenes.

Another way of improving the octane number of hydrocarbon fractions is by contacting them with a ZSM-5-type of aluminosilicate zeolite catalyst to produce new aromatic rings from aliphatic compounds. For example, U.S. Pat. No. 3,761,389 teaches aromatization of a hydrocarbon fraction boiling within the range of $C_2$ to 400° F. with a ZSM-5 type of synthetic aluminosilicate zeolite catalyst, and U.S. Pat. No. 3,756,942 teaches aromatization of a feed consisting essentially of $C_5+$ paraffins, olefins and/or naphthenes over a ZSM-5-type catalyst to produce a predominantly aromatic liquid and a light hydrocarbon gas. If the aromatization is performed at high temperature (e.g., about 538° C.) and low pressure (e.g., about 1 atmosphere) without added $H_2$, the light gas includes $C_2-C_4$ olefins as well as $C_1-C_4$ paraffins.

The art discloses several combinations of reacting a hydrocarbon stream over a reforming catalyst and over a ZSM-5-type catalyst. For example: in U.S. Pat. No. 3,729,409 there is described a process for upgrading a reformate by contacting the reformate and hydrogen with a ZSM-5-type zeolite, to selectively crack the normal paraffins and to form and alkylate aromatic compounds. In U.S. Pat. No. 3,849,290 there is described a process for reforming a naphtha and then removing normal and singly branched hydrocarbons by selective cracking to leave an aromatics-enriched product. In these two processes, some cracking of the alkyl side chain on the aromatic ring occurs, resulting in production of unwanted light ends. In U.S. Pat. No. 3,770,614 there is disclosed a process in which a reformate is fractionated and the light reformate fraction ($C_6$ to 116° or 127° C.) passed over a ZSM-5-type zeolite to alkylate mono-aromatics. In U.S. Pat. No. 3,950,241 there is disclosed a process for upgrading naphtha by separating it into low- and high-boiling fractions, reforming the low-boiling fraction, and combining the high-boiling naphtha with the reformate for contact with a ZSM-5-type catalyst to crack the paraffins.

Reacting heavy naphthas over ZSM-5-type catalysts in the absence of $H_2$ and at high temperatures leads to rapid catalyst deactivation, while processing naphthenes over them leads primarily to cracking, which reduces liquid yields.

We have found it advantageous to separate a naphtha into a light fraction and a heavy fraction, reform the heavy fraction, and combine at least a portion of the reformate with the light naphtha fraction to pass over ZSM-5-type catalyst under aromatization conditions, and then to separate a $C_5+$ product fraction from the aromatized effluent.

In particular, we have provided a process for upgrading a naphtha-boiling-range hydrocarbon to useful products which comprises:

(1) separating the naphtha into a light naphtha fraction containing $C_6$ aliphatics and lower-boiling hydrocarbons and a heavy naphtha fraction containing methylcyclopentane and higher-boiling hydrocarbons;

(2) reforming the heavy naphtha fraction under reforming conditions to produce a reformate;

(3) passing at least a portion of the reformate together with the light naphtha fraction in contact with a ZSM-5-type zeolite catalyst in at least one of the H-ZSM or Zn-ZSM forms under aromatization conditions including a pressure from 0.5 to 68 atmospheres and a temperature from 316° to 550° C. to produce an aromatics-enriched effluent;

(4) separating the aromatics-enriched effluent into a $C_4-$ fraction and a $C_5+$ fraction; and (5) recovering the $C_5+$ fraction as the product.

DESCRIPTION OF THE FIGURE

The FIGURE is a schematic block-type flow diagram of a preferred embodiment of the present invention in which each block represents one particular step or zone of the process. Conventional items such as pumps, compressors, miscellaneous valving, etc., are believed to be well within the skill in the art and have been omitted from the drawing. Likewise, with respect to the piping throughout the process system, only the major streams required to illustrate the relationships between the various stages are presented. Accordingly, various recycle lines and vent gas streams, etc., have also been omitted.

DETAILED DESCRIPTION

Referring to the flow diagram depicted in the FIGURE, a $C_5$ to $C_8$ straight-run naphtha obtained from an Alaskan North Slope crude oil is charged through line 20 into fractionator 21. The naphtha has an approximate composition of 55 volume percent paraffins, 35 volume percent naphthenes and 10 volume percent aromatics. In the fractionator, the naphtha is separated into a light fraction comprising $C_5$ and $C_6$ hydrocarbons boiling under about 66° C. (150° F.) and a heavy fraction including methylcyclopentane boiling above about 66° C. (150° F.). The light naphtha fraction, about 20 volume percent of the feed, is removed from fractionator 21 via line 25. The heavy naphtha fraction, about 80 volume percent of the feed, is charged via line 26 to reformer 27 in which it is reformed under conventional mild reforming conditions with a platinum-rhenium-chloride reforming catalyst (see, for example, U.S. Pat. No. 3,415,737, incorporated herein by reference) to increase the aromatics content and octane number of the naphtha. The reformate, in a yield of approximately 90 LV% and substantially depleted of naphthenes, is passed to separation zone 30 via line 28. In separation zone 30, which may comprise one or more stages, hydrogen is recovered for recycle to the reformer (not shown), light gases are removed and one or more reformate fractions are recovered.

In one embodiment of the present invention, for maximizing BTX production, the naphtha feed is preferably a $C_5$ to $C_8$ straight-run naphtha, and all of the $C_3+$ reformate is passed via line 31, combined with the light naphtha fraction in line 25 and passed into ZSM reaction zone 38. In the ZSM reaction zone, the normal and lightly branched paraffins undergo aromatization, and aromatics, particularly xylenes, are isomerized. The ZSM reaction zone is operated at reaction conditions including a temperature of 538° C. (1000° F.), no added hydrogen, and an LHSV of 2 V/V/Hr. The effluent from ZSM reaction zone 38 is passed via line 39 to separation zone 40 wherein a $C_5+$ product stream in an amount of about 70 weight percent of the combined feed in line 25 and rich in aromatics is separated and sent via line 48 for recovery of benzene, toluene and xylene values therefrom. The $C_4-$ component of the effluent is preferably separated into an $H_2/C_1/C_2$ fraction which is removed via line 42 and a $C_3/C_4$ fraction, in an amount of about 18 weight percent of the combined feed, which may be removed from the process via line 47 but which is preferably recycled via line 46 to ZSM reaction zone 38. The $C_3/C_4$ fraction may contain propylene and butenes in addition to propane and butane.

In another embodiment of the present invention, the naphtha feed is preferably a $C_5$ to $C_8$ straight-run naphtha, and the reformer effluent is separated in separation zone 30 into a $C_3$ to 135° C.− (275° F.−) fraction which is sent via line 31 to the ZSM reaction zone operated at conditions to form and isomerize aromatics, and a 135° C.+ (275° F.+) fraction rich in xylenes which may be passed via line 32 to a conventional xylene isomerization zone, such as that described in U.S. Pat. No. 3,948,758, incorporated herein by reference. When the feed is a full-boiling-range naphtha, a $C_9+$ fraction may be removed from separation zone 30 via line 33 and used as a high-octane (research octane number of about 116 Clear) gasoline blending stock. Advantages of this embodiment include a longer ZSM catalyst life because higher-end-point hydrocarbons which tend to coke the ZSM catalyst are not passed over it and a more efficient use of the ZSM catalyst and reactor because feeding the $C_8+$ aromatics to the ZSM reaction zone would not contribute to higher aromatics yields and would reduce catalyst life.

In yet another embodiment of the present invention, particularly useful for the production of high-octane gasoline, a full-boiling-range straight-run naphtha is the feedstock, the reformer effluent is separated in separation zone 30 into a light reformate fraction ($C_3$ to 104° C. or 220° F.), usually about 70 volume percent of the reformate, which is passed via line 31 to the ZSM reaction zone, and a heavy reformate fraction (104° C.+ or 220° F.+), usually having a research octane number of about 106 (Clear), which is sent to a gasoline pool (not shown) via line 32. The light reformate fraction in line 31 is combined with the light naphtha fraction in line 25 and preferably also with a recycle $C_3/C_4$ stream, and passed in contact with a ZSM-5-type zeolite catalyst at reaction conditions previously mentioned. The effluent from zone 38 is passed via line 39 to separation zone 40, from which a $C_5+$ fraction having a research octane number of about 116 (Clear) is removed via line 48 and combined with the heavy reformate fraction in line 32 to form a high-octane gasoline blending stock having a research octane number of at least 90 (Clear), and preferably 95 and still more preferably at least 100 or more. An advantage of this embodiment is that in splitting the reformate at 104° C. (220° F.), $C_7$ paraffins having a low octane number are included in the feedstock to the ZSM reaction zone in which they will undergo aromatization, but must of the toluene fraction is excluded since feeding it to the ZSM reaction zone would not increase aromatics yields.

Process Feeds

Feedstocks suitable for use in the process of the present invention include full-boiling-range naphtha hydrocarbon materials boiling in the range of $C_5$ hydrocarbons up to about 175° C. (347° F.) or 200° C. (392° F.) which contain low-octane paraffinic $C_5$ and $C_6$ components and preferably are $C_5$ to $C_8$ straight-run naphthas. The $C_6$ naphthenes in these naphthas are excellent reformer feedstock components, for they are efficiently converted to aromatics. The paraffins are undesirable as components of a gasoline pool because of their low research octane numbers, usually under about 70 (Clear, ASTM Method). The $C_7+$ paraffins are suitable reformer feed components, but the $C_6-$ paraffins are marginal because of the yield loss when they are cracked and the equilibrium amount of relatively low-octane normal and singly branched paraffins which remain after isomerization.

Reforming Stage

The reformer of the present invention is a conventional one in which the feedstock is contacted with a platinum-containing reforming catalyst, preferably a bimetallic catalyst such as platinum-rhenium-chloride on alumina, under reaction conditions such as a temperature from 427° to 552° C. (800°–1025° F.), preferably from 454°–538° C. (850°–1000° F.), a pressure from atmospheric to 50 atmospheres or higher, preferably from 6.8 to 40 atmospheres, a liquid hourly space velocity from 0.1 to 10, preferably from 0.5 to 5, and a hydrogen to hydrocarbon mol ratio from 0.5 to 20, and preferably from 1 to 10. During reforming a multitude of reactions takes place, including dehydrogenation, isomerization, dehydrocyclization, hydrocracking, and combinations thereof to yield a product having an increased content of aromatics and branched-chain hydrocarbons. The reformer is especially efficient when used to convert naphthenes to aromatics.

ZSM Stage

The light naphtha fraction together with at least a portion of the reformate, and preferably a recycle or externally supplied $C_3/C_4$ stream are passed over the ZSM-5-type catalyst in a ZSM reaction zone. The reaction zone is maintained under reaction conditions promoting aromatization of paraffinic compounds, such as a temperature from 343° to 649° C. (650° to 1200° F.), preferably from 454° to 566° C. (850° to 1050° F.) and still more preferably from 500° to 540° C. (932° to 1004° F.), a pressure from 0.5 to 35 atmospheres or higher, preferably from 1 to 10 atmospheres and more preferably 1 to 5 atmospheres, an LHSV from 0.1 to 20, preferably 1 to 5 and preferably in the absence of added hydrogen.

The ZSM-5-type zeolite itself is known in the art per se, and is exemplified by ZSM-5, ZSM-8, ZSM-11 and ZSM-35 and other similar materials. ZSM-5-type zeolites, described in U.S. Pat. Nos. 3,702,886, 3,729,409 and 3,770,614, describe the ZSM-5 preparation, composition and use as well as related information and are incorporated herein by reference. The H-ZSM-5 or Zn-H-ZSM-5 forms of the ZSM-5-type zeolites are preferred for use herein and may be obtained by conventional base and/or ion-exchange methods well known to the art. It is especially beneficial with respect to the catalyst life and coke formation for the ZSM-5 zeolite to have a silica-to-alumina mol ratio from 40 to 160, and preferably from 60 to 120.

The catalyst of the ZSM reaction zone may be in any convenient form, that is, as required for conventional fixed, fluid or slurry usage. Preferably, the ZSM-5-type is a fixed-bed type with the zeolite being composited with an inorganic binder or matrix such as alumina, silica, silica-alumina mixtures, naturally occurring and conventionally processed clays, e.g., kaolin and the like, as well as silica-magnesia, silica-zirconia, etc., and mixtures of any of them. The composite is preferably prepared by mixing the binder or matrix in the form of a gel or a cogel with the zeolite, followed by shaping or extruding to the desired form and size customary for the intended use. The relative proportions of zeolite and binder may vary widely, from 5% to 95% by weight, with preferably 35% to 80% and more preferably about 65% of the composition being zeolite. The preferred binder is alumina.

The advantage of the process of the present invention is that the reformer is used for what it does efficiently and in high yield: dehydrocyclization of naphthenes, while $C_6-$ paraffins are aromaticized over the ZSM catalyst to form high-octane aromatic compounds rather than cracked to $C_4-$ in the reformer, with the attendant yield loss.

What is claimed is:

1. A process for upgrading a naphtha-boiling-range hydrocarbon to useful products which comprises:
   (1) separating said naphtha just below the boiling point of methylcyclopentane into a light naphtha fraction containing $C_6$ paraffins and lower-boiling hydrocarbons and a heavy naphtha fraction containing methylcyclopentane and higher-boiling hydrocarbons;
   (2) reforming said heavy naphtha fraction under reforming conditions to produce a reformate enriched in aromatic compounds compared with said heavy naphtha fraction;
   (3) passing at least a portion of said reformate together with said light naphtha fraction in contact with a ZSM-5-type zeolite catalyst under aromatization conditions including a pressure from 0.5 to 68 atmospheres and a temperature from 343° to 649° C. to produce an aromatics-enriched effluent;
   (4) separating said aromatics-enriched effluent into a $C_4-$ fraction and a $C_5+$ fraction; and
   (5) recovering said $C_5+$ fraction as said product.

2. The process of claim 1 wherein the naphtha is a $C_5$ to $C_8$ straight-run naphtha and all of said reformate is passed in contact with said ZSM-5-type catalyst, and said product is sent for recovery of the benzene, toluene and xylene components therein.

3. The process of claim 1 wherein said reformate is separated into a first fraction boiling just below xylene and a second fraction containing xylene and higher-boiling components, said first fraction is said portion which is passed in contact with said ZSM-5-type catalyst, said product is sent for recovery of the benzene, toluene and xylene components thereof, and said second fraction is isomerized to optimize the xylene content thereof.

4. The process of claim 1 further comprising separating a $C_3/C_4$ fraction from said aromatics-enriched effluent, and recycling said $C_3/C_4$ fraction in contact with said ZSM-5-type catalyst.

5. The process of claim 1 wherein said ZSM-5-type catalyst is the Zn-H-ZSM-5 form.

6. The process of claim 1 wherein said ZSM-5-type catalyst is the H-ZSM-5 form.

7. The process of claim 1 wherein said aromatization conditions include a temperature from 500° to 540° C. and a pressure from 1 to 5 atmospheres, and no added hydrogen.

8. A process for upgrading a naphtha-boiling-range hydrocarbon to useful products, including a high-octane gasoline having a research octane number of at least 90 (Clear), which comprises:
   (1) separating said naphtha just below the boiling point of methylcyclopentane into a light naphtha fraction containing $C_6$ paraffins and lower-boiling hydrocarbons and a heavy naphtha fraction containing methylcyclopentane and higher-boiling hydrocarbons;
   (2) reforming said heavy naphtha fraction under reforming conditions selected to increase the octane rating of the gasoline-boiling-range product;
   (3) fractionating the product of the reforming operation into a light reformate which contains a substantial amount of $C_7-$ paraffins and a heavy reformate fraction which contains most of the toluene and the remaining high-boiling hydrocarbons;
   (4) forming aromatics from said paraffins by passing said light reformate together with said light naphtha fraction in contact with a ZSM-5-type zeolite catalyst under aromatization conditions including a pressure from 0.5 to 35 atmospheres, a temperature from 454° to 556° C. and no added hydrogen and recovering an aromatics-enriched effluent from said aromatization operation;
   (5) separating said aromatics-enriched effluent into a $C_4-$ fraction and a $C_5+$ fraction; and
   (6) combining said $C_5+$ fraction with said heavy reformate to produce said high-octane gasoline.

9. The process of claim 8 further comprising separating a $C_3/C_4$ fraction from said aromatics-enriched effluent and recycling said $C_3/C_4$ fraction in contact with said ZSM-5-type catalyst.

* * * * *